United States Patent [19]

Melby

[11] 4,388,448

[45] Jun. 14, 1983

[54] GLYCIDYL METHACRYLATE POLYMERS, THEIR PREPARATION AND SOLVOLYSIS PRODUCTS

[75] Inventor: Lester R. Melby, Wilmington, Del.

[73] Assignee: E. I. Du Pont de Nemours and Company, Wilmington, Del.

[21] Appl. No.: 236,854

[22] Filed: Feb. 23, 1981

[51] Int. Cl.$^3$ .......................... C08F 2/00; C08F 24/00
[52] U.S. Cl. ................................ 525/327.3; 526/215; 526/240; 526/245; 526/273; 525/383; 525/384; 525/386; 526/84; 525/216
[58] Field of Search ............... 526/173, 273, 245, 240, 526/215, 216, 84; 525/327.3, 383, 384, 386

[56] References Cited

U.S. PATENT DOCUMENTS

| | | | |
|---|---|---|---|
| 3,041,312 | 6/1962 | Boyd | 526/173 |
| 3,846,393 | 11/1974 | Milkovich et al. | 526/173 |
| 4,048,421 | 9/1977 | Kralicek et al. | 526/177 |
| 4,056,580 | 11/1977 | Lochmann et al. | 526/173 |

OTHER PUBLICATIONS

Müller et al., Macromolecules, 10, 1086, (1977).
Seow et al., Makromol. Chem., 178, 107, (1977).
Fukuda et al., J. Poly. Sci., A-1 10, 237, (1972).
Arbuzova et al., Vysokomol. Soyed., 5, 1819, (1963), CA 60 6932g.
Iwakura et al., Polymer Letters, 5, 29, (1967), CA 65877y.
Ito et al., Polymer Journal, I, 278, (1970), CA 73 45909b.
Roig et al., Polymer Letters, 3, 171, (1965).

*Primary Examiner*—Harry Wong, Jr.
*Attorney, Agent, or Firm*—James A. Costello

[57] ABSTRACT

Homopolymers of glycidyl methacrylate (GMA) and copolymers of GMA with other methacrylate comonomers; their preparation employing an anionic initiator which is the adduct of a selected organo(alkali metal) compound and at least one mole of methyl methacrylate or another lower alkyl methacrylate; as well as solvolyzed forms of the GMA polymers.

10 Claims, No Drawings

GLYCIDYL METHACRYLATE POLYMERS, THEIR PREPARATION AND SOLVOLYSIS PRODUCTS

BACKGROUND OF THE INVENTION

This invention concerns glycidyl methacrylate (GMA) polymer, copolymers of GMA and other methacrylate esters, solvolysis products of the GMA-containing polymers and a process for preparing said polymers.

Free-radical polymerization of GMA is known. The products, however, are not uniform with respect to molecular weight distribution with molecular weight being, in addition, difficult to control. Furthermore, in the case of block copolymerization, the block lengths of GMA are highly variant and, by the very nature of radically-induced systems, some GMA is inevitably incorporated randomly rather than in block fashion. For example, see "Block Copolymers", Noshay et al, Academic Press, New York, 1977, page 31.

There are literature reports that GMA can be anionically polymerized with simple alkyllithium reagents such as n-butyllithium: Arbuzova et al., Vysokomol. Soyed., 5, 1819 (1963), CA 60/6932g; Iwakura et al., Polymer Letters, 5, 29 (1967), CA 66 65877y; and Ito et al., Polymer Journal, 1, 278 (1970); CA 73/45909b. Contrary to such reports, Comparative Examples A to E hereafter demonstrate that GMA cannot be polymerized employing n-butyllithium (at low temperature in tetrahydrofuran).

U.S. Pat. No. 4,048,421, in Example VII, describes the anionic copolymerization of styrene and glycidyl methacrylate. There, the initiating species is an organic derivative of an alkali metal aluminum hydride. Patentees characterize the products as having broad molecular weight distributions; see, for instance, column 4, lines 38 to 43.

Anionic 1,1-diphenylhexyllithium (DPHLi) is known as an initiator for MMA to form essentially monodisperse polymers. However, DPHLi does not of itself initiate polymerization of GMA to give polymers of predictable and uniform composition. See Comparative Example F hereafter which was designed, using THF solvent at $-78°$ C., to produce a polymer with $\overline{M}_n$ of 4200. However, the product had a $\overline{M}_n$ of 24,000 and a broad molecular weight distribution ($\overline{M}_w/\overline{M}_n$ of 1.86). The discrepancy in the $\overline{M}_n$'s corresponded to destruction of about 83% of the initiator leaving only 17% of the living ends originally provided for. This untoward result occurred because the relatively highly nucleophilic diphenylhexyl anion reacted with the epoxide ring of GMA to form a non-initiating alkoxide species with insufficient opportunity for "living" chain propagation to occur.

Polymerization Mechanisms In General

A brief description of vinyl polymerization mechanisms will help place this invention in context. Vinyl polymerizations proceed in more-or-less discrete steps which include all or some of the following:
1. Initiation
2. Propagation
3. Chain transfer
4. Chain branching
5. Termination.

In an ideal anionic polymerization, the rate of initiation is infinitely faster than the rate of propagation with no chance for chain transfer, branching or spontaneous termination to occur. The steps are schematized in the following equations where $In^\ominus$ represents the initiating anion (with appropriate counter cation not represented) and M represents a monomer unit:

$$In^\ominus + M \rightarrow In\text{-}M^\ominus \; [\text{Initiation}] \tag{1}$$

$$In\text{-}M^\ominus + nM \rightarrow In\text{-}(M)^\ominus_{n+1} [\text{Propagation}]. \tag{2}$$

Such polymerizations proceed by a "living" mechanism which is to say that when propagation is complete the anionic terminus of the polymer has a finite lifetime and is capable of adding more monomer of the same or different kind with resultant chain lengthening. The polymerization can then be deliberately terminated in one of several ways if desired. It follows that the degree of polymerization (DP) is determined directly from the ratio of monomer concentration ([M]) to initiator concentration ([In]), and the number average molecular weight of the polymer ($\overline{M}_n$) is simply the product of the DP and the monomer unit molecular weight ($MW_m$) plus the molecular weight of the initiator moiety ($MW_{In}$):

$$\frac{[M]}{[In]} = DP \tag{3}$$

$$\overline{M}_n = DP \times (MW\,m) + MW_{In} \text{ or} \tag{4}$$

$$\overline{M}_n = \left(\frac{[M]}{[In]} \times MW_m\right) + MW_{In} \tag{5}$$

The more nearly ideal the system is, the less will be the molecular weight broadening. In the ideal case, the polymer will be monodisperse ($\overline{M}_w/\overline{M}_n = 1 + 1/DP$). Divergence from ideality will increase this ratio. In practice, absolute monodispersity is not achievable but can be closely approached so that $\overline{M}_w/\overline{M}_n$ values only slightly greater than unity are obtained.

The alkyl methcrylates are a class of monomer amenable to such polymerizations so that, for example, methyl methacrylate (MMA) polymers with $\overline{M}_w/\overline{M}_n$ of about 1.01 to 1.1 are possible. Narrow molecular weight distribution copolymers of MMA with other alkyl methacrylates have also been obtained and such manipulations enable one to vary polymer physical properties such as glass transition temperature, hardness, heat distortion temperature, and the like.

However, for uses such as adhesives or finishes, the polymers must contain chemically functional groups which can participate in crosslinking reactions either by thermosetting or air-curing. Such groups should also afford the possibility of chemical modification so as to provide water dispersibility or improved adhesion. In methacrylate polymers, these properties can be conferred by including GMA as a comonomer. The highly reactive epoxide group of the GMA can be postreacted with a variety of functional alcohols, carboxylic acids, amines or water. For such products to have optimum utility, they should be obtainable in predictable molecular weight ranges and have predetermined epoxide content, both with respect to amount and positioning along the polymer chain. This degree of control of polymer composition permits precise tailoring of polymer properties and, in the case of blends, allows better stoichiometric matching of mutually reactive functional groups.

SUMMARY OF THE INVENTION

All barriers to the preparation of GMA polymers and copolymers of predictable and uniform composition have now been overcome. It has been found that homopolymers and copolymers of GMA having controllable molecular weights and desirably narrow molecular-weight distributions can be made by anionic polymerization using as an initiator the adduct of a selected organo(alkali metal) compound with at least one mole of methyl methacrylate or another lower alkyl methacrylate in which the alkyl group contains 1 to 6 carbon atoms.

This invention concerns a polymer selected from the group consisting essentially of:
(i) poly(glycidyl methacrylate), and
(ii) copolymer of glycidyl methacrylate and at least one other methacrylate ester capable of anionic polymerization,
each of said polymer (i) and copolymer (ii) characterized by having:
(a) a polydispersity index ($\overline{M}_w/\overline{M}_n$) between about 1.0 to 1.4, and
(b) substantially all of its glycidyl methacrylate epoxide functions intact.

The methacrylic ester capable of anionic copolymerization with glycidyl methacrylate comprises compounds of the formula $CH_2=C(CH_3)CO_2R$, wherein R is selected from the group consisting essentially of:
(a) alkyl of 1 to 18 carbon atoms, branched or unbranched,
(b) alkenyl of 2 to 18 carbon atoms,
(c) alkadienyl of 5 to 18 carbon atoms,
(d) dialkylaminoalkyl of about 4 to 12 carbon atoms,
(e) alkoxyalkyl of about 3 to 12 carbon atoms, and
(f) lower fluoroalkyl, i.e., fluoroalkyl of 1 to 6 carbon atoms.

This invention also concerns block, random, and combination block and random copolymers of the monomers described herein. It is characteristic of the copolymers and process of this invention that the GMA polymer blocks can be inserted at well-defined positions in the polymer chain and that GMA block lengths can be precisely predetermined.

This invention also concerns a method for preparing the described polymers. The term "polymer" is used herein, depending on the context, to include both GMA homopolymer and copolymers of GMA and other methacrylate esters. The process of this invention is characterized by contacting GMA monomer or a combination of GMA and one or more other methacrylate esters capable of anionic polymerization, in solution, with a polymerization initiator that is the reaction product of an organo(alkali metal) compound and at least one mole of a lower alkyl methacrylate, at reduced temperatures. Temperatures of about −65° C. and below have typically been employed.

This invention also concerns solvolysis compositions formed from the polymers of this invention including polyols, amino alcohols, hydroxy ethers, hydroxy esters, and the like.

DETAILS OF THE INVENTION

Polymers

Typical polymers which can be obtained according to the teaching of this invention are as follows:

1. diblock and triblock copolymers of GMA and MMA,
2. random copolymers of GMA, MMA and BMA (butyl methacrylate),
3. random copolymers of GMA, MMA and LMA (lauryl methacrylate),
4. a random copolymer of GMA, MMA and BMA terminally blocked with VMA (vinyl methacrylate),
5. a random central section of MMA and BMA blocked on each end by poly(GMA),
6. homopoly(GMA).

Monomers which can be copolymerized with GMA are those capable of anionic polymerization and having the formula $CH_2=C(CH_3)CO_2R$, wherein R is as defined above. Representative methacrylate comonomers include the following:

Alkyl methacrylates such as methyl, ethyl, propyl, butyl, s-butyl, t-butyl, hexyl, octyl, 2-ethylhexyl, decyl, dodecyl, and octadecyl methacrylates;

Alkenyl methacrylates such as vinyl, allyl, methallyl, undecenyl, and 9-octadecenyl methacrylates;

Alkadienyl methacrylates such as 2,4-pentadienyl, 2,4-hexadienyl, 2,4-octadienyl, 4,7-octadienyl, 9,12-octadecadienyl, and geranyl methacrylates;

Dialkylaminoalkyl methacrylates such as 2-dimethylaminoethyl, 3-dimethylaminopropyl, 6-diethylaminohexyl, 2-diethylaminoethyl, 2-dibutylaminoethyl, 2-dihexylaminoethyl, and 6-dimethylaminohexyl methacrylates;

Alkoxyalkyl methacrylates such as 2-methoxyethyl, 2-ethoxyethyl, 2-butoxyethyl, and 3- and 4-methoxybutyl methacrylates;

Fluoroalkyl methacrylates such as 2,2,2-trifluoroethyl and 1$\underline{H}$,1$\underline{H}$,5$\underline{H}$-perfluoropentyl methacrylates.

The contemplated organo(alkali metal) compound, AM', that is used to form the initiator, where A is as defined hereafter and M' is an alkali metal, is an organic anion in combination with a counterion of any alkali metal. Lithium is the preferred alkali-metal cation.

Representative useful organo(alkali metal) compounds include the following:

1,1-Diphenylhexyl(alkali metals);

Adducts of any alkyl(alkali metal), n-, sec-, or tert-, with any 1,1-diaryl-substituted ethylene provided the aryl substituents are free of electrophilic substituents,

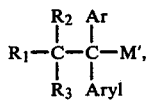

wherein:
$R_1$ = alkyl,
$R_2$ = H or alkyl,
$R_3$ = H or alkyl,
Ar is aryl,
M' = alkali metal;

Diisopropylamido(alkali metals);

An adduct of any secondary or tertiary alkyl(alkali metal) ($R_1M'$) with any pyridine unsubstituted in the 2, 5, and 6 positions, i.e.,

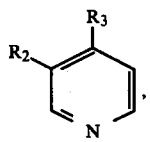

to give the adduct

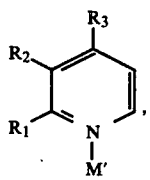

wherein $R_2$ and $R_3$ are non-electrophilic;

Cumyl and cumyl-type alkali metal derivatives where substituent limitations are as described above:

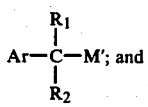

Polynuclear hydrocarbon-alkali metal adducts such as naphthalenesodium and biphenylsodium.

Of the foregoing compounds, the diphenylhexyl, cumyl, and diisopropylamido compounds are preferred. The diphenylhexyl compounds can be generated in situ by addition of n-butyl(alkali metal) to 1,1-diphenylethylene.

Ideally, a 1:1 molar ratio of methyl methacrylate (or other lower alkyl methacrylate) to organo(alkali metal) compound is sufficient to generate an initiator species. Usually, however, to allow for non-ideal conditions, about three moles of AMA are added for each mole of organo(alkali metal) compound to avoid the possibility that some of the latter will remain free. Thus, in effect, the actual concentration of initiator is determined by the initial concentration of the organo(alkali metal) compound.

Where the organo moiety of the organo(alkali metal) initiator component is represented as A, the initiator will have the form:

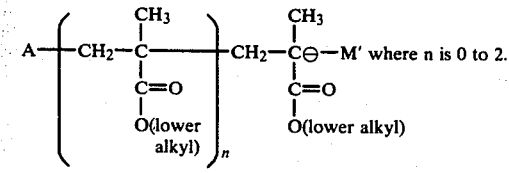

Using an initiator where the organo moiety is diphenylhexyl, the homopolymerization of GMA, proceeding by a normal "living" anionic polymerization mechanism, is as follows:

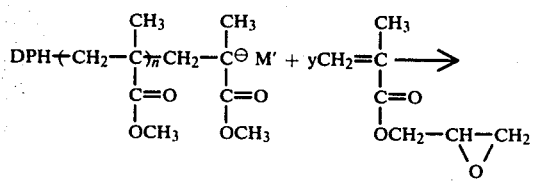

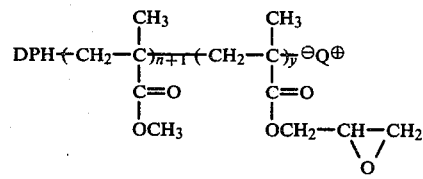

where
n is as defined above,
y is at least 6, and
Q is the terminating cation group.

The polymers and copolymers of the invention can be represented by the formula:

$$A—(AMA)_x(GMA)_y(RMA)_z Q$$

where
A is the organic moiety of the organo(alkali metal) compound used to form the initiator;
AMA is the alkyl methacrylate that is reacted with the organo(alkali metal) compound to form the initiator;
GMA is glycidyl methacrylate;
RMA represents one or more methacrylate esters that can be copolymerized with GMA:
x is the number of alkyl methacrylate units in the organo(alkali metal)/methacrylate ester adduct that is the initiator, and is at least 1 and usually 1 to 3, although it can be greater than 3;
y is the total number of combined GMA units in the chain, and is at least 1 when z is greater than zero, i.e., in a copolymer, and is at least about 6 when x is 1 to 3 and z is zero, i.e., in a homopolymer;
z is the total number of combined RMA units in the chain and is zero (in a homopolymer) or greater than zero (in a copolymer); and
Q is a terminating group and is usually H.

When z is greater than zero, the R groups in the combined RMA units can be the same or different. It will be obvious to one skilled in the art based on the discussion presented herein that this formula does not necessarily represent the order and manner in which the combined monomer units appear in the chain.

In a typical polymerization, the starting anion of known concentration is generated at room temperature under an inert atmosphere in a solvent and then cooled in a solid carbon dioxide-acetone bath to about −78° C. Then, three molar equivalents of MMA monomer are added dropwise. If a random copolymer is desired, then a mixture of GMA with other monomer(s) is added in appropriate total molar amount to achieve the desired DP. The addition rate is such as to maintain the mixture temperature at about −70° C. If GMA homopolymer is desired then GMA is added without comonomers. Alternatively, different monomers can be blocked onto the living GMA block, and onto each other. For practical purposes, GMA homopolymer refers to poly(GMA) in which at least six GMA units are attached to the initial moiety which contains one to three MMA units.

The polymerization can be terminated with a protic material such as water, methanol or acetic acid and the polymer can be isolated by stripping off the solvent. Alternatively, the polymer can be precipitated in water or hexane; or warmed to room temperature.

A typical total monomer charge of one mole in one liter (1 M) and initiator concentrations between about 0.1 M and 0.0015 M will give DPs ranging from 10 to 650 and $\overline{M}_n$s from about 1000 to 100,000 depending on individual monomer molecular weights. At this molarity, the solutions are about 10 to 15% solids when polymerization is complete. Lower concentrations (5 to 10%) are acceptable. Higher concentrations (above 15%) cause increased viscosity which may interfere with proper mixing during the latter stages of monomer addition. Incomplete mixing may lead to an undesirable broadening in molecular weight distribution. The rate of monomer addition should be maintained so as to keep the reaction temperature below about $-65°$ C. Products so obtained have polydispersity indices ($\overline{M}_w/\overline{M}_n$) between about 1.0 and 1.4, most typically about 1.1 to 1.2.

As to solvents, tetrahydrofuran (THF) is preferred. Other ether-type solvents such as 1,2-dimethoxyethane (DME or glyme), diethylene glycol dimethyl ether (diglyme) or mixtures of these with aromatic hydrocarbons are useful provided such solvents and solvent mixtures remain liquid at temperatures as low as $-80°$ C. and that they retain solvent power for both initiator and polymer down to those temperatures.

All reagents, solvents, and monomer should be pure, free of molecular oxygen and the reactions must be run in an inert atmosphere such as nitrogen or argon which are free of moisture and air. The living anion would be terminated by intrusion of protic materials or other adventitious electrophiles. And, of course, the carbanion is subject to air oxidation which would lead to undesirable, early termination.

Solvolysis Products

Contemplated solvolysis products include the following which can be prepared by the described methods. Glycidyl methacrylate polymers can be hydrolyzed to polyols by the simple expedient of dissolving them in acetone or THF and treating with an excess of aqueous mineral acid. In this way, each epoxide group is hydrolyzed to a 1,2-diol function:

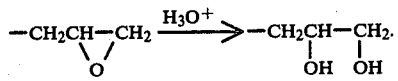

Clearly, the higher the glycidyl content of the polymer the more hydroxylic and polar will be the product. Incorporation of such polymers as components in automotive paint finishes will enhance properties such as dispersibility or adhesion. If sufficiently hydroxylic, the polymers act as dispersants or detergents and well hydrolyzed homopoly(GMA) may actually be water soluble.

Aminolysis or ammonolysis will form poly(amino alcohols):

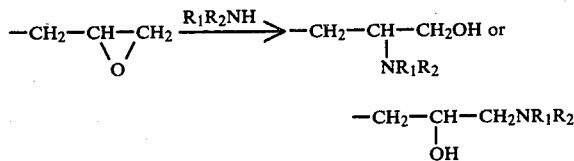

where
$R_1=R_2=H$,
$R_1=H$, $R_2=$alkyl, or
$R_1=$alkyl, $R_2=$alkyl.

Acid or base catalyzed alcoholysis gives hydroxy ethers:

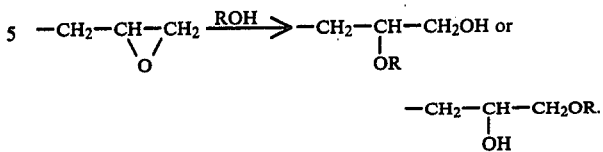

If the alcohol is unsaturated, e.g., allyl, sorbyl or linoleyl alcohol, the product will contain potential air drying sites.

Similarly, carboxylic acid addition will form hydroxy esters:

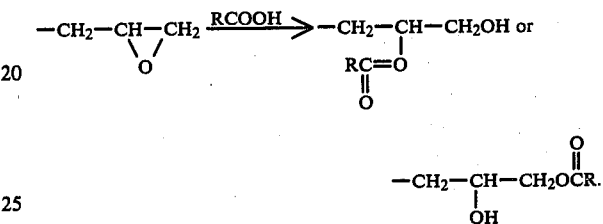

Again, if the acid R group is unsaturated, e.g., acrylic acid, methacrylic acid, sorbic acid, linoleic acid, potential air drying sites become incorporated into the product.

The GMA homopolymers and copolymers of the invention are useful as components of powder coating compositions. Such compositions are well known in the art. Powder coating compositions containing GMA polymers are described in, for example, U.S. Pat. Nos. 3,752,870, 3,876,587, 3,914,333, 4,089,910, and 4,137,277. A typical composition will contain (1) a copolymer of GMA with at least one other ethylenically unsaturated monomer, which is usually an alkyl or hydroxyalkyl methacrylate (or acrylate) or both, and (2) a polycarboxylic acid, usually a dicarboxylic acid, which can be for example an aliphatic dicarboxylic acid or a carboxyl-ended polyester. Optionally, the composition may additionally contain a curing catalyst, a flow-control agent, a pigment, and/or an antistatic agent. The patents cited above contain many specific Examples of how these various components are incorporated in the coating compositions.

The polymers of this invention are desirable components in powder finish applications primarily because of their narrow molecular weight distribution. Thus, there is no need to employ potentially destabilizing chain transfer agents to control molecular weight. Furthermore, the polymers of this invention can be precipitated in water making it unnecessary to employ volatile organics which are sometimes detrimental to the coating process.

EXAMPLES

The Examples illustrate the invention. All Examples produced polymers characterized by $\overline{M}_w/\overline{M}_n$ between about 1.0 to 1.4 having substantially all of their glycidyl methacrylate epoxide functions intact. A brief explanation of materials and methods follows. Commercial-grade argon was purified by passage through activated nickel and molecular sieves. THF was purified by refluxing with a mixture of 1,1-diphenylethylene and sodium or lithium metal under an argon atmosphere. Industrial-grade methyl methacrylate (MMA) monomer was passed through anhydrous alumina under argon into an argon-flushed container containing hydroquinone inhibitor equivalent to 10 ppm based on the MMA.

Glycidyl, butyl, and lauryl methacrylates are commercial products and were vacuum distilled prior to use. After distillation, phenothiazine inhibitor was added (about 10 ppm). The methacrylates were purged with argon for one hour and stored at 4° C. Boiling points were as follows:
GMA 74° C. (10 mm)
BMA 67° C. (20 mm)
LMA 138° C. (2 mm).

Vinyl methacrylate (VMA) is a commercially available product, b.p. 60° C. (118 mm). Commercially-available 1,1-diphenylethylene was vacuum distilled discarding the first 10% and collecting the next 80%. It was stored at 4° C. under argon. All other chemicals were reagent grade. All equipment was baked in an oven at 140° C. for at least two hours prior to use.

Proton NMR spectra were determined in deuterochloroform with tetramethylsilane as internal reference on a Varian A-60 or EM-390 spectrometer.

In the block copolymerizations described here, initiator was generated at room temperature from n-butyllithium and equimolar 1,1-diphenylethylene or diisopropylamine in THF. The solution was cooled to $-74°$ C. and the first block of monomer was based on the amount of initiator. The rate of addition was such that the temperature rose no higher than $-70°$ C. The temperature was then allowed to fall back to $-74°$ C., and the second block was added (from either single monomer or premixed monomers) to give a random block. This was repeated to whatever number of blocks were desired. The volume of THF was chosen to give a final polymer concentration of about 15%. The cold solution was quenched with a slight excess of acetic acid, methanol or water, allowed to come to room temperature and then precipitated by filtration into ten volumes of water or hexane.

Gel permeation chromatography (GPC) was carried out on 0.25% solutions in THF through three $\mu$-Styragel ® columns at 35° C. The standards were Lucite ® 40 samples which were characterized by absolute methods. Instrument broadening correction was determined using known polystyrene standards.

In molecular weight ranges below about 10,000, the GPC $\overline{M}_n$'s are lower than anticipated from monomer to initiator charge ratio. However, if the polymer has an internal reference (such as the ten aromatic protons of the diphenylhexyl initiator's end group) then integration versus, say, the ester $OCH_3$ intensity, gives values for the degree of polymerization (DP) which are satisfactorily close to those expected. Thus, if there is a discrepancy between the GPC and NMR results, the latter is taken as the more dependable.

COMPARATIVE EXAMPLES A TO E

Failure of n-Butyllithium to Initiate GMA

COMPARATIVE EXAMPLE A

Into a sealable tube under argon was placed 30 ml of THF and 0.75 ml of 1.6 M n-BuLi in hexane (1.2 mmole) and the solution was cooled to $-78°$ C. Then, 4.2 ml (30 mmole) of GMA was injected, the tube was sealed and kept at $-78°$ C. for forty hours. When portions were added to ten volumes of methanol, hexane, or water, no precipitate formed. No polymer formed; and no polymer formed when the monomer was added dropwise to a stirred solution of n-BuLi in THF under argon at $-78°$ C.

COMPARATIVE EXAMPLE B

A reaction similar to Comparative Example A was carried out except that the n-butyllithium was injected into a cold ($-78°$ C.) solution of THF and GMA. After forty hours at $-78°$, one-third aliquots were poured into 100 ml of water, methanol, and hexane, respectively. No solid formed in the water. A trace of solid formed in the methanol but it was not filterable. A trace of flocculent solid formed in the hexane. It was collected on a filter and dried, but weighed only about 90 mg, too small an amount to characterize. Furthermore, it was not completely soluble in chloroform so that even if polyGMA were present the amount would have been less than 90 mg and conversion would correspond to less than 2%.

COMPARATIVE EXAMPLE C

A reaction similar to Comparative Example B was carried out but the cold THF-GMA solution was bubbled with nitrogen while the n-butyllithium was added dropwise to achieve good mixing. After forty hours at $-78°$ C. the solution was poured into 300 ml of hexane. No solid precipitated, thus no polymer had formed.

COMPARATIVE EXAMPLE D

Into a 250 ml, 3-necked flask with mechanical stirrer and argon atmosphere was transferred 100 ml of purified THF. It was cooled to $-76°$ C. and 2.5 ml of 1.6 M n-butyllithium in hexane was injected, followed by dropwise addition of 14 ml (0.1 mole) of GMA. The temperature rose to $-73°$ C. during the addition then fell back to $-76°$ C. No solid was formed when portions were added to water, methanol, and hexane, thus no polymer had formed.

COMPARATIVE EXAMPLE E

A reaction similar to Comparative Example D was carried out except that n-butyllithium was injected into the $-78°$ C. solution of THF and GMA. The temperature rose to $-78°$ C. and then fell back to $-76°$ C. No solid was obtained when precipitations were attempted in methanol, water, and hexane, thus no polymerization had occurred.

COMPARATIVE EXAMPLE F

Initiation of GMA with 1,1-Diphenylhexyllithium

Into a flask equipped with a mechanical stirrer and under a constant flow of argon was injected 0.8 ml (0.0044 mole) of 1,1-diphenylethylene followed by 100 ml of THF and 0.0038 mole of 1.6 M n-BuLi in hexane. The blood red color of diphenylhexyllithium developed immediately and the solution was stirred at room temperature for five minutes. It was then cooled to $-74°$ C. and 3.2 ml (0.024 mole) of GMA was added dropwise from a hypodermic syringe. The red color discharged to a faint yellow after about 0.5 ml had been added, and the temperature rose to $-70°$ C. until addition was complete (about 5 minutes). The temperature then returned to $-74°$ C. and 10 ml (0.09 mole) of MMA was added dropwise at such a rate that the temperature did not exceed $-69°$ C. (about 15 minutes). Following that, another 3.2 ml of GMA was added, the solution was stirred at −72° C. for 10 min, 1 ml of methanol was injected and the solution was poured into 1 liter of hexane. The stringy white polymer was collected and dried; yield, 15.0 g (97%).

The GPC analysis showed $\overline{M}_n$ 24,000, $\overline{M}_w$ 44,000; $\overline{M}_w/\overline{M}_n$ of 1.86 (theoretical $\overline{M}_n$: 4,200).

The proton NMR spectrum showed a weak aromatic resonance δ7.12 characteristic of the diphenylhexyl initiator fragment. The epoxide protons were characterized by a broad doublet spanning δ2.5–3.0 and a broad singlet δ3.1–3.3. The glycidyl ester OCH$_2$ group resonance showed two peaks δ4.2 and 4.4.

EXAMPLES 1 AND 2

Initiation with Diphenylhexyl-MMA Block

In the same manner as in Comparative Example B, diphenylhexyllithium was generated from 1.8 ml (0.01 mole) of diphenylethylene and 0.008 mole of n-BuLi in 130 ml of THF, then cooled to −76° C. A 0.024 mole (2.6 ml) portion of MMA was added followed by 0.025 mole (3.4 ml) of GMA, which in turn was followed by 10 ml (0.094 mole) of MMA. A 25-ml portion was syringed out of the cold solution and injected into 250 ml of water to obtain 2.2 g of solid polymer A.

To the remainder of the original cold polymer solution was added another 3.0 ml (0.21 mole) of GMA. The solution was stirred at −76° C. for five minutes more, 1 ml of methanol was added and the solution was poured into 1200 ml of water to obtain 17.3 g of solid polymer B; 95% yield and conversion.

Theoretical compositions of A and B are as follows (subscript D.P.'s):

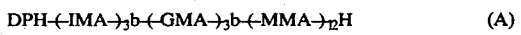

DPH-(-IMA-)$_3$b-(-GMA-)$_3$b-(-MMA-)$_{12}$H  (A)

DPH-(-MA-)$_3$b-(-GMA-)$_3$b-(-MMA-)$_{12}$b-(-GMA-)$_3$H  (B)

For Composition A (Example 1), NMR integration of the aromatic protons (δ7.12) vs the epoxide methylene multiplet (δ2.5–3.0) indicated a D.P. of 3 to 4 for the GMA; and vs the OCH$_3$ methyl resonance (δ3.6) a D.P. of about 13 for the MMA. This is in excellent agreement with theory. The GPC showed $\overline{M}_n$ 1300; $\overline{M}_w$ 1600; $\overline{M}_w/\overline{M}_n$ 1.22.

For Composition B (Example 2), similar NMR analysis indicated a D.P of about 7 for the GMA and 13 to 14 for the MMA portion. The GPC showed $\overline{M}_n$ 1500; $\overline{M}_w$ 1700; $\overline{M}_w/\overline{M}_n$ 1.16.

Thus, the system showed the control and product uniformity characteristic of an uncomplicated, living anionic polymerization. The glass transition temperature (T$_g$) of Composition B was 70° to 72° C.

EXAMPLE 3

Initiator MMA Block Limited to One Unit

Lithium diisopropylamide was generated from 0.01 mole each of n-butyllithium and diisopropylamine in 125 ml of THF at room temperature and the solution was cooled to −74° C. To it was added 1 ml (0.01 mole) of MMA followed in order by 2.75 ml (0.02 mole) of GMA, 16 ml (0.15 mole) of MMA and, finally, 2.75 ml (0.02 mole) of GMA maintaining the temperature below −70° C. The reaction was quenched with 1 ml of acetic acid and the polymer was precipitated by pouring into 1500 ml of water. The product, 21.3 g, was isolated, redissolved in THF and reprecipitated in hexane; 94% yield and conversion. The GPC showed $\overline{M}_n$ 2300; $\overline{M}_w$ 3100; $\overline{M}_w/\overline{M}_n$ 1.36 and the T$_g$ was 76° to 78° C.

The NMR clearly showed the epoxide methylene group protons as a seven-peak multiplet between δ2.5 to 3.0.

EXAMPLE 4

Initiator MMA Block of Three Units

An experiment similar to Example 3 was carried out except that the first MMA block was increased to three units (0.03 mole). The yield of isolated polymer was 23.4 g (quantitative) and the GPC showed $\overline{M}_n$ 2300; $\overline{M}_w$ 2500; $\overline{M}_w/\overline{M}_n$ 1.1. The T$_g$ was 80° to 83° C. The NMR was indistinguishable from that of Example 3.

EXAMPLE 5

A Random Copolymer of 50 Weight Percent of MMA, 35 Weight Percent of BMA and 15 Weight Percent of GMA Diphenylhexyllithium was generated from 0.01 mole each of diphenylethylene (1.8 ml) and n-BuLi (6.3 ml of 1.6 M solution in hexane) in 300 ml of THF. The solution was cooled to −77° C. To it was added, dropwise, 3.2 ml (0.03 mole) of MMA. Five minutes later, a mixture of 23.4 ml (0.22 mole) of MMA, 19.7 ml (0.123 mole) of BMA and 7.2 ml (0.053 mole) of GMA was added dropwise keeping the temperature below −70° C.

The workup was as described in Example 3, to obtain 47.5 g (91% yield and conversion) of white powder. The GPC showed $\overline{M}_n$ 3800, $\overline{M}_w$ 4200; $\overline{M}_w/\overline{M}_n$ 1.1; T$_g$ was 72° to 74° C.

The NMR showed butyl group absorption at δ0.92 and 1.02 as shoulders on the syndiotactic methyl backbone peaks at δ0.88 and another broad butyl peak δ1.31–1.66. The epoxide methylene absorption was a seven-peak multiplet spanning δ2.5–3.0. The ester methyl peak was a sharp singlet δ3.6 with shoulder peaks at δ3.93 and δ3.85 due to the butoxy and glycidyl OCH$_2$ groups, and the aromatic peak was at δ7.15.

EXAMPLE 6

Diphenylhexyllithium was generated from 0.014 mole each of diphenylethylene and n-BuLi in 1000 ml of THF, then cooled to −77° C. and 3.2 ml (0.03 mole) of MMA was added to generate the initiator. To it was added a mixture of MMA, BMA and GMA in twice the amount used in Example 5. The final product weighed 104.5 (quantitative yield); $\overline{M}_n$ 6100; $\overline{M}_w$ 6300; $\overline{M}_w/\overline{M}_n$ 1.03. The NMR was identical with that of Example 5, but the aromatic peak was weaker.

EXAMPLE 7

MMA/BMA/GMA Copolymer Endblocked with VMA

Diphenylhexyllithium (0.01 mole) was generated in 300 ml of THF as described above, the solution was cooled to −76° C. and 0.03 mole of MMA was added. This was followed by a mixture of 0.22 mole of MMA, 0.123 mole of BMA and 0.053 mole of GMA, keeping the temperature at or below 70° C. When the temperature had returned to −76° C. after completion of addition, a 0.05 mole (6.4 ml) portion of VMA was added.

When worked up as described previously, there was obtained 56.2 g of white polymer (97% yield and conversion), $\overline{M}_n$ 5300; $\overline{M}_w$ 6300; $\overline{M}_w/\overline{M}_n$ 1.19. The NMR was very similar to that of Example 5, but in addition showed well-resolved vinyl resonances at δ4.56, 4.67, 4.80 and 5.03.

EXAMPLE 8

MMA/GMA/LMA Random Copolymer

Diphenylhexyllithium (0.005 mole) was generated in 100 ml of THF, the solution was cooled to −74° and 0.03 mole of MMA was added. This was followed by a mixture of 0.13 mole MMA, 0.03 mole GMA and 0.01 mole LMA and the product, 25.0 g, worked up in the usual way. The yield was 25.0 g (quantitative). GPC showed $\overline{M}_n$ 3200; $\overline{M}_w$ 3800; $\overline{M}_w/\overline{M}_n$ 1.19.

The NMR was virtually identical with that of Example 3 but showed a strong, sharp lauryl resonance at δ1.30. The $T_g$ was 64° to 67° C.

EXAMPLE 9

GMA Homopolymer

The initiator was generated from 0.005 of diphenylhexyllithium formed at room temperature in 100 ml of THF followed by addition of 0.015 mole of MMA added at −74° C. To this was added dropwise 10 ml (0.073 mole) of GMA. Five minutes after addition was complete, 1 ml of methanol was added and the product, 12.4 g, was precipitated in 750 ml of water. The yield was 12.4 g (quantitative). The GPC showed $\overline{M}_n$ 1600; $\overline{M}_w$ 1900; $\overline{M}_w/\overline{M}_n$ 1.19 and the $T_g$ was 48° to 52° C.

The MNR was dominated by twelve major peaks between δ2.5 and δ4.5 characteristic of the glycidyl ether and ester protons, the methyl OCH₃ at δ3.6 being a minor constituent. In addition strong broad peaks were evident at δ0.95 and 2.0 characteristic of the methacrylate backbone protons.

EXAMPLE 10

Hydrolysis of GMA Homopolymer

A 5-g portion of the product from Example 9 was dissolved in 100 ml of acetone and 10 ml of 1 M sulfuric acid was added. The mixture was stirred at room temperature for 18 hours. When about 1 ml was added to water (10 ml) it completely dissolved and when layered with 10 ml of chloroform and shaken, it proved to be an excellent emulsifier.

The original solution was freed of acetone on a rotary evaporator and dissolved in 50 ml of water which was then neutralized to pH 7 with barium oxide. The barium sulfate precipitate was digested on a steam bath for one hour, cooled, filtered, and the clear filtrate stripped to a glassy solid. This was further dried at about 50° C. under high vacuum of about 0.2 mm Hg. The yield was 2.5 g.

The white friable powder was insoluble in the usual NMR solvents, but the IR spectrum (Nujol mull) showed a strong broad hydroxyl band at 2.95, secondary alcohol C—O at 9.0 and primary alcohol C—O at 9.5, all absent in the starting material.

EXAMPLE 11

Hydrolysis of an MMA/BMA/GMA Copolymer

A copolymer similar to that of Example 5 was prepared. It had $\overline{M}_n$ 2800; $\overline{M}_w$ 3400; $\overline{M}_w/\overline{M}_n$ 1.20.

A 20 g portion was dissolved in 200 ml of THF, 15 ml of 1 M sulfuric acid was added, and the solution was allowed to stand at room temperature overnight. The product was precipitated in 100 ml of water, collected and dried. Recovery was 15 g (75%).

The NMR spectrum was completely free of the glycidyl resonances at δ2.5–3.0, δ3.2 and δ4.2–4.6. The GPC showed $\overline{M}_n$ 2100; $\overline{M}_w$ 2700; $\overline{M}_w/\overline{M}_n$ 1.31.

EXAMPLES 12 AND 13

Preparation and In Situ Hydrolysis of an MMA/BMA Copolymer Blocked on Each End with GMA Segments Initiator was prepared as previously described from 0.01 mole of lithium diisopropylamide and 0.02 mole of MMA in 150 ml of THF at −77° C. A block of 0.023 mole of GMA was added followed by a mixture of 0.06 mole of MMA and 0.04 mole of BMA. Onto the end of this block was blocked another 0.023 mole of GMA.

A 50 ml aliquot was removed and precipitated in 500 ml of water to obtain Composition A (Example 12). This has the nominal composition:

(i-Pr)₂N—(—MMA—)₂b—(—GMA—)₂b—(—MMA)₆/BMA₄—)-b-(—GMA)₂H.

To the remainder was added 10 ml of 1 M sulfuric acid and the solution was stirred at room temperature for two days. The product was precipitated in water, isolated and dried to obtain Composition B (Example 13).

The NMR of Composition A showed the characteristic epoxide proton resonances at δ2.5–3.0 (multiplet) and δ3.0–3.4 which were completely absent in hydrolyzed Composition B. The latter showed a broad well resolved resonance at δ4.1. Addition of trifluoroacetic acid (TFA) changed the latter to a less intense peak at δ3.8–4.8 as a shoulder on the main OCH₃ peak at δ3.7. The TFA effect indicates hydroxyl proton contribution to the δ4.1 peak. GPC data: Example 12, $\overline{M}_n$ 1800; $\overline{M}_w$ 2100; $\overline{M}_w/M_n$ 1.21. Example 13, $\overline{M}_n$ 1500; $\overline{M}_w$ 1900; $\overline{M}_w/\overline{M}_n$ 1.27; $T_g$ of 70° to 75° C.

EXAMPLE 14

GMA Copolymer Reaction with Sorbic Acid to Form Sorbate Ester Groups by Epoxide Ring Opening The starting material was a copolymer made by the usual procedure and having the nominal composition:

random
(iPR)₂N—(—MMA—)₃b—(—MMA₉/GMA₄)H.

Ten g of the copolymer, 2.25 g of sorbic acid and 0.1 g of triphenylphosphine as catalyst in 100 ml of toluene was refluxed under nitrogen for 18 hrs then cooled to room temperature. A 10-ml portion was removed and added slowly to 100 ml of hexane. The solid was collected, washed with additional hexane, and dried.

Compared to the NMR of the starting material, the product showed a new band, 1.95, due to the sorbic methyl group. The intensity of the epoxide multiplet (δ2.5–3.3) was halved with reference to the ester —OCH₃ resonance 3.6. The glycidyl —OCH₂-multiplet (δ3.85–4.5) had changed to a single broad peak δ4.27. Sorbate vinyl proton resonances were at δ5.75, 6.0, 6.2, 6.35 and a multiplet spanning δ7.1–7.7.

The remainder was refluxed for 18 hrs longer. It was cooled, extracted with two 50-ml portions of 5% sodium bicarbonate and two 50-ml portions of water. The organic layer was dried with sodium sulfate, filtered and polymer precipitated by pouring into ten volumes of hexane to obtain 5.6 g of product.

The NMR of the product was unchanged. In summary, the intensity of the vinyl resonance was twice that of the epoxide —CH$_2$— group implying equal molar amounts of sorbate ester and unchanged epoxide. Thus, 50% reaction had occurred to form sorbate ester:

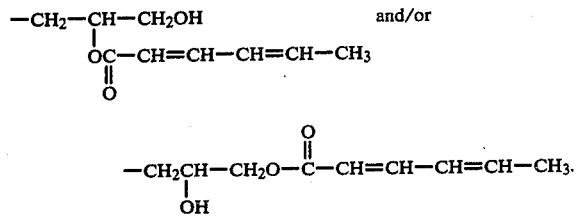

EXAMPLE 15

GMA Copolymer Reaction with Sorbyl Alcohol to Form Sorbyl Ether Groups by Epoxide Ring Opening Accompanied by Toluenesulfonate Ester Formation A copolymer was prepared in the manner previously described and had the nominal composition:

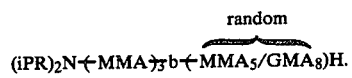

Ten g of the copolymer, 4 ml or sorbyl alcohol and 1 g of p-toluenesulfonic acid in 100 ml of toluene was refluxed under nitrogen for 18 hrs. Then, the solution was extracted and the polymer precipitated as described in Example 14 to obtain 5.8 g of product.

The NMR spectrum showed p-toluenesulfonate group as methyl resonances at δ2.43 and aromatic resonances at δ7.30 and 7.73 (both doublets, J9). The sorbyl vinyl protons showed a multiplet spanning δ5.2–6.3. The intensity ratios of the aromatic and vinyl protons to unchanged epoxide —CH$_2$— protons were 1:1:4 corresponding to a mole ratio of 1:1:8. Thus, 10% conversion to tosylate ester and 10% to sorbyl ether had occurred.

EXAMPLE 16

A Random GMA Copolymer Initiated with the Diphenylhexyl-MMA Adduct

Diphenylhexyllithium (0.06 mole) was generated in the usual way in 500 ml of THF and the solution was cooled to −74° C. To it was added 19 ml (0.18 mole) of MMA followed by a mixture of 57 g (0.54 mole) of MMA and 33 ml (0.25 mole) of GMA during about thirty minutes. After it was all added, the solution was stirred at −74° C. for ten minutes and was acidified with 4 ml of acetic acid. The solution was warmed to room temperature and suction filtered through a fine-fritted filter into 1700 ml of magnetically stirred hexane. The white solid, 101.3 g, was collected and dried; yield and conversion was 84%.

The NMR corresponded almost precisely to a composition with $\overline{M}_n$ 2000:

Thus, the ten protons of the aromatic resonance would correspond to 44 glycidyl OCH$_2$ and methyl OCH$_3$ protons (found 43 spanning δ3.2–4.6) and 12 epoxide protons (found 15 spanning δ2.5–3.3). The epoxide resonances appeared at δ2.62(s), 2.80(t) and 3.2(s).

The GPC showed $\overline{M}_n$ 900, $\overline{M}_w$ 1200; $\overline{M}_w/\overline{M}_n$ 1.35.

EXAMPLE 17

A Block Copolymer of Projected Composition DPH(MMA)₃b(GMA)₂b-MMA)₉b(GMA)₂H

Under argon in a 3-neck flask equipped with a mechanical stirrer at room temperature and in the presence of 250 ml of THF was prepared 0.03 mole of DPHLi from 0.03 mole each of 1,1-diphenylethylene and n-BuLi. It was cooled to −78° C. and 0.09 mole of MMA was added dropwise over about 5 min. This was followed by stepwise addition of (8.5 ml (0.06 mole) of GMA, 28.5 ml (0.27 mole) of MMA and finally another 0.06 mole of GMA, all at such a rate that the temperature did not rise above −70° C. Precipitation in hexane afforded 47.4 g of white solid polymer.

Integration of the ester proton NMR resonances in the δ3.6 region vs. the ten aromatic protons at δ7.15 showed a degree of polymerization corresponding to $\overline{M}_n$ 2000 (projected $\overline{M}_n$ 2005). The GPC results showed $\overline{M}_n$ 1100, $\overline{M}_w$ 1400, $\overline{M}_w/\overline{M}_n$ 1.31.

EXAMPLE 18

A Block Copolymer of Projected Composition DPH(MMA)₃b(GMA)₂b(MMA)₇b(GMA)₂b(MMA)₂H This experiment was run in a manner similar to that of Example 17 except that the first GMA addition was followed stepwise by 22.5 ml (0.21 mole) of MMA, then 8.5 ml (0.06 mole) of GMA and finally 6.5 ml (0.06 mole) of MMA.

The yield of product precipitated from hexane was 42.7 g and the NMR was identical with that of Example 25 indicating $\overline{M}_n$ 2000 (projected 2005). GPC showed $\overline{M}_n$ 1400, $\overline{M}_w$ 1900, $\overline{M}_w/\overline{M}_n$ 1.35.

EXAMPLE 19

Sorbyl Alcohol Condensation with Polymer of Example 16

Ten g of the random copolymer from Example 16 (equivalent to about 0.02 mole of epoxide), 2.2 ml of sorbyl alcohol (0.02 mole) and 0.014 g-atom of lithium metal in 100 ml of THF was refluxed for 18 hrs. The mixture was cooled to room temperature, a 10-ml aliquot was removed and added to 100 ml of hexane containing 2 ml of ethanol. The solid polymer was collected, redissolved in THF (10 ml/g) and the solution was suction filtered through a fine frit into 100 ml of stirring water. Again the product was collected and dried.

The NMR showed sorbyl vinyl proton resonances spanning δ5.3–6.4 (about twelve peaks). The integrated intensity ratio of the vinyl resonance to the aromatic resonance (δ7.1, equivalent to ten protons) was about 2.5:10 corresponding to about 0.625 mole of sorbyl group per mole of polymer. This corresponds to about 15% conversion of the original epoxide groups to sorbyl ether functions of the type:

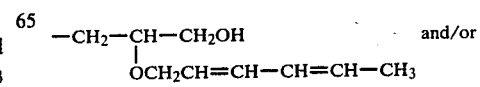

-continued

—CH$_2$—CH—CH$_2$OCH$_2$CH=CH—CH=CH—CH$_3$.
　　|
　　OH

In addition, the glycidyl ester —OCH$_2$— protons which originally showed two resonances at δ4.20 and 4.35 were augmented with resonances at δ4.15(d), 4.25(d), 4.37(s) and 4.47(s).

EXAMPLE 20

The Sorbyl Ether of the Polymer from Example 25

A mixture of 10 g of the polymer from Example 17, 2.2 ml of sorbyl alcohol (2,4-hexadienol) and 0.1 g of lithium metal in 100 ml of THF was refluxed under nitrogen for 18 hours. The mixture was then cooled and a 10-ml portion was poured into 100 ml of hexane containing 2 ml of ethanol to obtain the solid product. To further purify, it was redissolved in 10 ml of THF and suction filtered through a fine frit into 100 ml of water. The precipitated solid was collected and dried.

The NMR spectrum of the product showed well-defined vinyl proton resonances as a twelve-peak multiplet spanning δ5.3–6.4 characteristic of the attached sorbyl groups. The integrated intensity of the vinyl resonance vs the ten aromatic protons (δ7.15) was 4:10 which corresponds to about 25% conversion of the original epoxide groups to sorbyl ethers.

EXAMPLE 21

Sorbyl Alcohol Condensation with the Polymer from Example 18

The procedure of Example 19 was carried out with 2.0 g of polymer from Example 18.

Similar manipulation of the NMR data showed a vinyl/aromatic ratio of about 3.5:10, corresponding to about 20% conversion or about 0.8 sorbyl group per mole of polymer.

EXAMPLE 22

A Random MMA/GMA Copolymer Containing 25 Mole Percent of GMA

Into a 500 ml, 3-neck flask with mechanical stirrer and continuous argon purge was charged 250 ml of purified THF and 4.5 ml (0.03 mole) of diisopropylamine followed by 0.03 mole of n-BuLi to generate lithium diisopropylamide. It was then cooled to −74° C. and 9.5 ml (0.09 mole) of MMA was added dropwise during 5 min. It was followed by a mixture of 28.7 ml (0.27 mole) of MMA and 16.4 ml (0.12 mole) of GMA, the rate of addition being such that the temperature did not rise above −70° C. After addition was complete, the solution was stirred for an additional 5 min then 2 ml of methanol was added and polymer was isolated by precipitation in 2500 ml of hexane. The yield was 56 g (quantitative conversion).

The NMR showed typical syndiotactic methyl resonances at δ0.85 and 1.87, isopropyl group resonances at δ0.95, a seven-peak epoxide multiplet spanning δ2.5–3.3, OCH$_3$ at δ3.6 and glycidyl OCH$_2$ ester peaks at δ3.85, 3.95, 4.1, 4.2 and 4.45. GPC: $\overline{M}_n$ 1600, $\overline{M}_w$ 1800, $\overline{M}_w/\overline{M}_n$ 1.13.

EXAMPLE 23

A Random MMA/GMA Copolymer Containing 50 Mole Percent of GMA

This experiment was run in the manner of Example 22 but using 0.02 mole of isopropylamine and 0.02 mole of n-BuLi followed by 0.06 mole of MMA and then a mixture of 0.1 mole of MMA with 0.16 mole of GMA. The yield was 40.3 g (99% conversion).

The NMR was similar to that of the product from Example 22, but the integrated intensity of epoxide region δ2.5–3.3 was twice that of the product of Example 22. GPC: $\overline{M}_n$ 1800, $\overline{M}_w$ 2100, $\overline{M}_w/\overline{M}_n$ 1.12.

EXAMPLE 24

A Random MMA/GMA Copolymer Containing 11 Mole Percent of GMA

This experiment was run in a manner similar to that of Example 22, but the MMA/GMA mixture consisted of 0.39 mole of MMA and 8.2 ml of GMA. The yield was 56.6 g (95% conversion).

The NMR was similar to that of Example 22, but the epoxide resonance intensity was about half that of the product of Example 22. GPC: $\overline{M}_n$ 1600, $\overline{M}_w$ 1800, $\overline{M}_w/\overline{M}_n$ 1.13.

TABLE 1

EPOXIDE TITRATION OF GMA POLYMERS[a]

| Example No. | Projected Composition | $\overline{M}_n$ By GPC | $\overline{M}_n$ By NMR | Percent Epoxide Oxygen Calc[b] | Percent Epoxide Oxygen Found |
|---|---|---|---|---|---|
| 1 | DPH-(MMA)$_3$-b-(GMA)$_3$-b-(MMA)$_{12}$H | 1300 | 2200 | (3.7) 2.2 | 2.2 |
| 2 | DPH-(MMA)$_3$-b-(GMA)$_3$-b-(MMA)$_{12}$-b-(GMA)$_3$H | 1500 | 2600 | (6.4) 3.7 | 3.9 |
| 7 | random DPH-(MMA)$_3$-b-(MMA$_{22}$/BMA$_{12}$/GMA$_5$)-b-(VMA)$_5$H | 5300 | 5700 | (1.5) 1.4 | 1.7 |
| 9 | DPH-(MMA)$_3$-b-(GMA)$_{17}$H | 1600 | 2500 | (15.0) 9.6 | 9.1 |
| 10 | Hydrolysis product of polymer of Ex. 9 | — | — | nil | 0.3 |
| 16 | random (i-Pr)$_2$N-(MMA)$_3$-b-(MMA$_9$/GMA$_4$)-H | 1600 | 1900 | (4.1) 3.4 | 3.5[c] |
| 17 | random (i-Pr)$_2$N-(MMA)$_3$-b-(MMA$_5$/GMA$_8$)-H | 1800 | 2000 | (7.1) 6.4 | 6.0[c] |
| 18 | random (i-Pr)$_2$N-(MMA)$_3$-b-(MMA$_{13}$/GMA)$_7$H | 1600 | 2000 | (2.0) 1.6 | 1.5[c] |

TABLE 1-continued
EPOXIDE TITRATION OF GMA POLYMERS[a]

| Example No. | Projected Composition | $\overline{M}_n$ By GPC | $\overline{M}_n$ By NMR | Percent Epoxide Oxygen Calc[b] | Percent Epoxide Oxygen Found |
|---|---|---|---|---|---|
| 14 | Sorbate ester of polymer of Ex. 16 | — | — | — | 1.5[d] 1.2 |
| 15 | Sorbyl ether tosylate of polymer of Ex. 17 | — | — | — | 4.5[d] 4.6 |
| 19 | DPH$\left(\text{MMA}\right)_3$b$\left(\text{GMA}\right)_7$b$\left(\text{MMA}\right)_3$b$\left(\text{GMA}\right)_7$H | 1100 | 2000 | (5.8) 3.2 | 3.4 |
| 20 | DPH$\left(\text{MMA}\right)_3$b$\left(\text{GMA}\right)_7$b$\left(\text{MMA}\right)_7$b$\left(\text{GMA}\right)_7$b$\left(\text{MMA}\right)_7$H | 1400 | 2000 | (4.6) 3.2 | 3.5 |

[a]Potentiometric titration with perchloric acid in acetic acid with tetraethylammonium bromide as supporting electrolyte.
[b]Values in parentheses based on $\overline{M}_n$ by GPC, the other based on NMR.
[c]Corrected for consumption of titrant by amino group.
[d]See sample calculation, post.

Sample Calculations of Epoxide Content of GMA Polymer Derivative

Assume a starting polymer with $\overline{M}_n$ 2000 and four GMA units having been 15% converted to sorbyl ether by reaction with sorbyl alcohol.

Epoxide oxygen content of starting material $=(4\times 16)/2000\times 100=3.2\%$.

In the product, 15% of epoxide units have been converted leaving $4-(0.15\times 4)=3.4$ epoxides per mole.

Sorbyl alcohol has a MW$=98$. Therefore, the weight of sorbyl alcohol added $=(0.15\times 4)\times 98=59$.

Thus, the $\overline{M}_n$ of product $=2000+59=2059$. This contains 3.4 epoxides.

Therefore, the product percent epoxide oxygen $=(3.4\times 16)/2059\times 100=2.6\%$.

POLYMER CONFIGURATION BY NMR

Because of the asymmetric carbon atom alpha to the carbalkoxy group in methacrylate polymers they can assume any of three configurations to a greater or lesser degree. That configuration in which all of the backbone methyl substituents are on the same side of the polymer chain is isotactic (I), that in which they regularly alternate on one side and the other is syndiotactic (S) and that in which the methyl placements are random is heterotactic (H). In practice, pure forms of one or the other are not obtained. Rather, the polymer chain will incorporate stretches of all three although one may predominate.

In poly(methyl methacrylate) (PMMA) itself, the configuration can be readily determined by nuclear magnetic spectroscopy (NMR). The isotactic form has a major methyl peak at $\delta 1.2$ and the backbone methylene groups show peaks at $\delta 2.4$ (singlet), 2.0 (singlet) and a fairly well-resolved doublet at $\delta 2.3$. The heterotactic form shows a major methyl peak at $\delta 1.0$ flanked by peaks at $\delta 1.2$ and 0.85 and the backbone methylene groups show as a broad unresolved singlet at $\delta 1.9$. The syndiotactic form has a major methyl peak at $\delta 0.85$ and the methylene band is also a broad singlet at $\delta 1.9$ (Reference: Bovey et al, J. Polymer Science, 44, 173 (1960). The $\delta$ values are in parts per million (ppm) downfield from tetramethylsilane reference in deuterochloroform solvent and are typically reproducible to within $\pm 0.8$ ppm.

The polyGMA prepared in toluene with n-butyllithium initiator by Ito et al (Polymer Journal, 1, 278 [1970]) has an I:H:S ratio of 33:38:29. In the polymers of this invention, the I content is so low as to be unresolvable in the NMR. For example, in the polymers of Examples 22, 23, and 24, the I resonance appears as a barely discernible shoulder on the low-field side of the H resonance. The I content is estimated to be between 2% and 5%. The H and S peaks are approximately equal in intensity and their combined proportion is estimated to be greater than 95%. Thus, the polymers of this invention have a markedly different structure from those of Ito et al obtained by n-BuLi initiation in toluene. There are not, however, such distinctions vis-a-vis Ito et al products prepared in THF. Nevertheless, Ito et al products prepared in THF would not have the polydispersities which characterize the polymer and copolymer of this invention.

The embodiments of the invention in which an exclusive property or privilege is claimed are defined as follows:

1. A polymer selected from the group consisting essentially of:
   (i) poly(glycidyl methacrylate), and
   (ii) copolymer of glycidyl methacrylate and at least one other methacrylate ester capable of anionic polymerization, each of said polymer (i) and copolymer (ii) characterized by having
   (a) a polydispersity index $(\overline{M}_w/\overline{M}_n)$ between about 1.0 to 1.4, and
   (b) substantially all glycidyl methacrylate epoxide functions intact;

polymer (i) and copolymer (ii) being represented by the formula

A—AMA)$_x$(GMA)$_y$(RMA)$_z$Q wherein
A is the organic moiety of an organo(alkali metal) compound used to form an initiator adduct with AMA, said organo(alkali metal) compound being selected from the group consisting essentially of 1,1 diphenylhexyl(alkali metal), adduct of an alkyl(alkali metal) with 1,1-diaryl-substituted ethylene wherein the aryl substituents are free of electrophilic substituents, diisopropylamido(alkali metal), adduct of a secondary or tertiary alkyl(alkali metal) with a pyridine unsubstituted in the 2,5 and 6 positions wherein adduct substituents are nonelectrophilic, cumyl and cumyl-type alkali metal derivatives free of electrophilic substituents, and polynuclear hydrocarbon-alkali metal adducts;
AMA is alkyl methacrylate in which the alkyl group has 1 to 18 carbon atoms;
GMA is glycidyl methacrylate;
RMA represents one or more methacrylate esters selected from the group consisting essentially of alkyl of 1 to 18 carbon atoms, alkenyl of 2 to 18 carbon atoms, alkadienyl of 5 to 18 carbon atoms, dialkylaminoalkyl of about 4 to 12 carbon atoms, alkoxyalkyl of about 3 to 12 carbon atoms, and lower fluoroalkyl;

x is the number of methacrylate units in the initiator adduct and is at least 1;

y is the total number of combined GMA units in the chain, and is at least 1 when z is greater than zero, and at least 6 when x is 1 to 3 and z is zero;

z is the total number of combined RMA units in the chain and is zero in a homopolymer and greater than zero in a copolymer; and Q is a terminating group formed by terminating the polymerization with a protic material or by warming to room temperature.

2. A block copolymer according to claim 1.

3. A random copolymer according to claim 1.

4. A combination block and random copolymer according to claim 1.

5. A method for preparing the polymer of claim 1 characterized by contacting glycidyl methacrylate monomer or a combination of glycidyl methacrylate and one or more other methacrylate esters with a polymerization initiator that is the reaction product of an organo(alkali metal) compound and at least one mole of a lower alkyl methacrylate, in solution at reduced temperature;

the organo(alkali metal) compound being selected from the group consisting essentially of:

(i) a compound of the formula

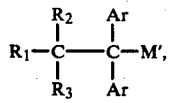

wherein:
$R_1$ = alkyl,
$R_2$ = H or alkyl,
$R_3$ = H or alkyl,
Ar is aryl,
M' = alkali metal;

(ii) diisopropylamido(alkali metal);

(iii) a compound of the formula

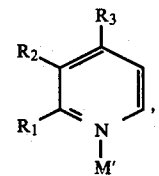

wherein $R_1$ is secondary or tertiary alkyl and $R_2$, $R_3$, and M' are as defined;

(iv) a compound of the formula

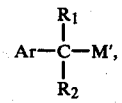

wherein $R_1$ and $R_2$ are alkyl and Ar and M' are as defined; and (v) polynuclear hydrocarbon-alkali metal adducts.

6. A method according to claim 5 employing lithium as the alkali metal.

7. A method according to claim 5 employing as initiator:

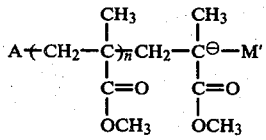

where A is the organo moiety of the organo(alkali metal) compound, n is 0 to 2, and M' is an alkali metal.

8. A method according to claim 7 comprising employing an initiator wherein the organo moiety is 1,1-diphenylhexyl, diisopropylamido, or cumyl.

9. A method according to claim 5 wherein compound (i) is 1,1-diphenylhexyl(alkali metal).

10. A method according to claim 9 wherein compound (i) is 1,1-diphenylhexyllithium.

* * * * *